United States Patent [19]

Brinkmeyer et al.

[11] Patent Number: 4,579,934

[45] Date of Patent: Apr. 1, 1986

[54] THERMOTROPIC, AROMATIC POLYESTER CARBONATES, PROCESS FOR THE PRODUCTION THEREOF AND MOULDINGS, FILAMENTS, FIBERS AND FILMS THEREOF

[75] Inventors: Hermann Brinkmeyer; Manfred Schmidt; Hermann Perrey, all of Krefeld; Aziz E. Sayed, Leverkusen, all of Fed. Rep. of Germany

[73] Assignee: Bayer Aktiengesellschaft, Leverkusen, Fed. Rep. of Germany

[21] Appl. No.: 627,970

[22] Filed: Jul. 3, 1984

[30] Foreign Application Priority Data

Jul. 16, 1983 [DE] Fed. Rep. of Germany ....... 3325704

[51] Int. Cl.⁴ .......................................... C08G 63/64
[52] U.S. Cl. .................................. 528/193; 528/125; 528/126; 528/128; 528/173; 528/190; 528/191; 528/194; 528/271
[58] Field of Search ............... 528/190, 191, 173, 125, 528/126, 128, 193, 194, 271

[56] References Cited

U.S. PATENT DOCUMENTS

| | | | |
|---|---|---|---|
| 4,156,069 | 5/1979 | Prevorsek et al. | 528/193 |
| 4,284,757 | 8/1981 | Fayolle | 528/193 |
| 4,310,652 | 1/1982 | DeBona et al. | 528/190 |
| 4,398,018 | 8/1983 | Akkapeddi et al. | 528/193 |
| 4,435,561 | 3/1984 | Lai et al. | 528/190 |

*Primary Examiner*—Lester L. Lee
*Attorney, Agent, or Firm*—Connolly and Hutz

[57] ABSTRACT

Thermotropic, wholly-aromatic polyester carbonates which contain condensed radicals of 4,4'-dihydroxydiphenyl have a reduced viscosity in the melt, without the mechanical properties of the product suffering therefrom.

7 Claims, No Drawings

THERMOTROPIC, AROMATIC POLYESTER CARBONATES, PROCESS FOR THE PRODUCTION THEREOF AND MOULDINGS, FILAMENTS, FIBERS AND FILMS THEREOF

This invention relates to high molecular weight thermotropic, wholly aromatic polyester carbonates having a high impact strength and a favourable melt viscosity, to a process for the production thereof by transesterification and to the use thereof in the production of mouldings, filaments, fibres and films.

The term "thermotropic" refers to those polycondensates which form liquid-crystalline melts. They are well known; see, for example, the following publications:

F. E. McFarlane et al., Liquid Crystal Polymers II, Contemporary Topics in Polymer Science, Vol. 2, Plenum Publishing Corporation, 1977;

W. J. Jackson and H. F. Kuhfuss, J. Polymer Science, Polymer Chem. Ed. 12, 2042, (1976);

W. C. Wooten et al. in A. Ciferri "Ultra-High Modulus Polymers", Applied Science Publ., London 1979, P. 362 et seq;

A. Blumstein et al., "Liquid Crystalline Order in Polymers", Academic Press 1978;

EP Nos. 22 344, 24 499, 15 856, 17 310, 15 088, 8 855, WO Nos. 79/01034, 79/797, and DE-OS No. 2,751,653.

The liquid-crystalline condition of the polycondensate melts may be investigated using a polarising microscope. For the investigations, the eyepiece was fitted with an attachment which contained a photodiode at the focus of the eyepiece lens. Using a measurement amplifier connected in series and equipped with a control device, the value with the microscope switched on, with the nicol prisms in parallel arrangement and in the absence of a material sample, was adjusted to 100 scale divisions. When the nicol prisms were crossed, a value of 0.01 scale divisions resulted.

The layer thickness of the polycondensate melts which were investigated amounted to 100 μm.

The liquid crystalline melts were studied once the samples had been melted at a temperature at which the melts were so thinly liquid that they moved in turbulent manner following slight displacement of the cover slip over the object slide.

In order to ensure that the optical anisotropy of the melts is to be attributed to a liquid crystalline condition and not, say, to crystals of the polycondensate floating in the melt, the melt was heated to a further 30° C. above the test temperature after the measurement. In so doing, crystals melt and as a result the optical anisotropy of the melt disappears. Only when the lightening of the melt observed between nicol prisms did not disappear, in spite of further heating the melt, were the polycondensates classified as thermotropic. In the measuring system, they showed values of above 1 scale division and for the most part values of from 3 to 90 scale divisions. On the other hand, for amorphous melts for example aromatic polycarbonates, values of less than 0.1 scale division were found.

The above-described method is particularly suitable for a rapid determination in a laboratory and produces clear results in practically all cases. However, in cases of doubt, it may be expedient to detect the presence of liquid crystalline components in the melt by means of X-ray wide-angle scattering as described, for example, by G. W. Gray and P. A. Windsor in "Plastic Crystals, Physico-Chemical Properties and Methods of Investigation", in particular Chapter 3, John Wiley & Sons, New York, Sydney, Toronto 1974.

DE-OS No. 2,025,971 relates to high molecular weight wholly-aromatic polyesters based on p-hydroxybenzoic acid, aromatic dicarboxylic acids (such as tere-phthalic acid and isophthalic acid) and diphenols (such as hydroquinone or 4,4'-dihydroxydiphenyl). These polyesters are thermotropic on account of the components which are used. They may be processed into fibres, for example. Of the 13 polyesters referred to in the Examples, just one melts at a temperature below 300° C. Thus, these polyesters are difficult to process.

DE-PS No. 2,704,315 describes thermotropic wholly-aromatic polyester carbonates based on p-hydroxybenzoic acid, carbonic acid, hydroquinone and optionally an aromatic dicarboxylic acid. The flow temperatures of these polyester carbonates are at least 265° C. (Example 5), which corresponds to a melt viscosity which is too high for straightforward processing. Although the flow temperature may be reduced by renouncing the solid phase post-condensation and the increase in molecular weight which is associated therewith, this also entails a deterioration in the mechanical properties.

Thus, an object of the present invention is to provide thermotropic, wholly-aromatic polyester carbonates which are easier to process, compared to the polyester carbonates of DE-PS No. 2,704,315, and which still have outstanding mechanical properties. The new products should have a melt index (DIN 53 735) of at least 10 g/10 minutes, preferably at least 20 g/10 minutes, in particular at least 40 g/10 minutes (300° C./21.6 kp). If the melt index of the polyester carbonates according to the present invention reaches the stated values under conditions which are less drastic than 300° C./21.6 kp, then of course they also satisfy the requirement of the specified minimum melt index. Polyester carbonates which are preferred according to the present invention have a melt index (DIN 53 735) of at the most 200 g/10 minutes, preferably at the most 150 g/10 minutes (300° C./21.6 kp). At the same time, the new products should have an impact strength of at least 20 kJ/m², preferably at least 30 kJ/m², in particular at least 40 kJ/m². Moreover, the new products should have a notched impact strength of at least 10 kJ/m², preferably at least 20 kJ/m², in particular at least 30 kJ/m². Furthermore, they should have a bending E-modulus of at least 2,700, preferably at least 3,000, in particular at least 3,500.

Surprising, it has been found that wholly aromatic polyester carbonates which contain condensed radicals of 4,4'-dihydroxydiphenyl have the desired combination of advantageous properties.

The present invention provides thermotropic, wholly-aromatic polyester carbonates based on:
(a) (optionally substitued) p-hydroxybenzoic acid;
(b) diphenol;
(c) carbonic acid; and, optionally,
(d) aromatic dicarboxylic acid;

characterised in that some of the diphenol radicals (b) are present as 4,4'-dihydroxydiphenyl radicals (e) and, apart from the end groups, the following applies to the molar ratios of the radicals:

$a+b=1$;
$b=c+d$;
$e/b=$ from 0.1 to 0.9, preferably from 0.11 to 0.7, in particular from 0.125 to 0.4; and
$c/(c+d)=$ from 0.6 to 1;
$a=$ from 0.4 to 0.8, preferably from 0.6 to 0.75;

b−e=from 0.02 to 0.53, preferably from 0.06 to 0.36, in particular from 0.1 to 0.35;
c=from 0.12 to 0.6, preferably from 0.175 to 0.4;
d=from 0 to 0.24, preferably from 0 to 0.12; and
e=from 0.02 to 0.53, preferably from 0.0275 to 0.28, in particular from 0.03 to 0.16.

Preferred p-hydroxybenzoic acids (a) are p-hydroxybenzoic acids which are substituted one or more times on the nucleus by $C_1$–$C_4$ alky., $C_1$–$C_4$ alkoxy, $C_6$–$C_{10}$ aryl or $C_6$–$C_{10}$ alkaryl, (such as phenyl, tolyl or naphthyl), or halogen (preferably chlorine or bromine), for example 4-hydroxy-2-methyl-benzoic acid, 4-hydroxy-3-methyl-benzoic acid, 2-ethyl-4-hydroxy-benzoic acid, 3-ethyl-4-hydroxy-benzoic acid, 2- or 3-chloro-4-hydroxy-benzoic acid, 4-hydroxy-2-phenyl-benzoic acid or 4-hydroxy-3-phenyl-benzoic acid, but preferably unsubstituted p-hydroxybenzoic acid itself.

Preferred diphenols (b) are compounds corresponding to the following general formula:

HO—Z—OH         (I)

wherein Z represents a divalent mono- or poly-nuclear aromatic radical having from 6 to 30 carbon atoms which is such that the two OH groups are each directly bound to carbon atoms of an aromatic system, for example
(1) hydroquinone, methyl-hydroquinone, ethyl-hydroquinone, 1,4-dihydroxy-naphthalene, 1,5-dihydroxy-naphthalene, 2,6-dihydroxy-naphthalene, which do not produce substantial bending of the polycondensate chain; and
(2) compounds which contribute to substantial bending of the polycondensate chain, for example resorcinol, 1,6-dihydroxy naphthalene, 2,5-dihydroxy-naphthalene, 2,7-dihydroxy-naphthalene and bisphenols corresponding to the following general formula:

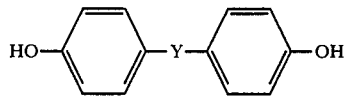
(II)

wherein Y represents an alkylene or alkylidene radical having from 1 to 7 carbon atoms, a cycloalkylene or cycloalkylidene radical having from 5 to 12 carbon atoms, —O—, —S—,

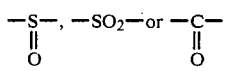

and the nuclear-alkylated and nuclear-halogenated derivatives thereof, for example
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones and
4,4'-bis-(hydroxyphenyl)-diisopropyl-benzenes,
and the nuclear-alkylated and nuclear-halogenated compounds thereof, for example
bis-(4-hydroxyphenyl)-methane,
1,1-bis-(4-hydroxyphenyl)-ethane, bisphenol A,
1,1-bis-(4-hydroxyphenyl)-cyclohexane,
bis-(4-hydroxyphenyl)-sulphone,
4,4'-dihydroxy-diphenyl ether and
4,4'-dihydroxy-diphenyl sulphide.

It is advisable to select the diphenols such that at the most 30 mol %, based on the total quantity of diphenol radicals, are diphenol radicals of type (2). A high proportion of diphenol radicals of type (2) is justifiable in particular if it is "compensated for" by additional linear radicals, for example terephthalic acid radicals.

Derivatives which are preferred for incorporating the carbonate groups (c) include phosgene and diaryl carbonates, for example diphenyl carbonate, ditolyl carbonate, phenyl-tolyl carbonate, dinaphthyl carbonate, dialkyl carbonates, such as diethyl carbonate, dimethyl carbonate, dimethyl dicarbonate and diethyl dicarbonate, glycol carbonate and chloroformic acid esters.

Preferred aromatic dicarboxylic acids (d) have from 8 to 24, preferably from 8 to 14, carbon atoms and they may be substituted, per aromatic ring, by up to four $C_1$–$C_4$ alkyl radicals, $C_1$–$C_4$-alkoxy radicals or halogen atoms (preferably chlorine or bromine), for example naphthalene-1,5-dicarboxylic acid, diphenyl-2,2-dicarboxylic acid, diphenyl-4,4'-dicarboxylic acid, diphenylmethane-4,4'-dicarboxylic acid, diphenyl ether-4,4'-dicarboxylic acid, diphenyl sulphone-4,4'-dicarboxylic acid, preferably terephthalic acid, isophthalic acid and naphthalene-2,6-dicarboxylic acid and the nuclear-substituted derivatives thereof.

The polyester carbonates according to the present invention may contain —H, —OH, —OC$_6$H$_5$ or radicals originating from chain-terminators as end groups.

The polyester carbonates according to the present invention may contain the radicals of the compounds (a) to (e) in a random distribution or in blocks.

The polyester carbonates according to the present invention usually have an inherent viscosity of at least 0.5 dl/g, preferably at least 1.0 dl/g, (measured using a solution of 5 mg of polyester carbonate/ml of p-chlorophenol at 50° C.) If the polyester carbonates are insoluble in p-chlorophenol, it is assumed that they have the specified minimum viscosity. Thus, they correspond to the present invention as long as they satisfy the defined parameters.

The polyester carbonates according to the present invention may be produced by various processes, for example by the condensation of the carboxylic acid chlorides or by the esterification of the carboxylic acid aryl esters with the phenolic compounds and by subsequent polycondensation, in which case the carboxylic acid chlorides may also be produced in situ from the corresponding carboxylic acids and chlorinating agents. When the polyester carbonates are produced by esterification and subsequent polycondensation, phenol is distilled off from the reaction mixture until the desired degree of condensation is attained.

A process is preferred in which the carboxylic acids are reacted with a diaryl carbonate, preferably diphenyl carbonate, to produce the aryl esters and these are then reacted with the phenolic compounds.

The radicals of the compounds (a) to (e) are incorporated into the polyester carbonate in the ratio of the starting components. The diaryl carbonate is an exception in the above-described preferred embodiment of the transesterification process, which carbonate is required, on the one hand, as a reagent for the formation of the carboxylic acid aryl esters and, on the other hand, for the formation of the carbonate groups in the polyester carbonate. Thus, the equivalent ratio of diaryl carbonate:carboxylic acid derivatives in this embodiment is at least 1:1, preferably (from 1.01 to 1.1):1.

It is appropriate to accelerate the esterification or transesterification reactions and the polycondensation reactions by means of a catalyst. Catalysts of this type are known, for example oxides, hydrides, hydroxides, halides, alcoholates, phenolates, salts of organic or inorganic acids, complex salts or mixed salts of alkali metals, for example lithium, sodium and potassium; of the alkaline earth metals, for example magnesium and calcium; of Secondary Group elements, for example vanadium, titanium, manganese, cobalt, nickel, zinc, lanthanum, cerium, zirconium, or of elements of other groups of the Periodic Table, for example germanium, tin, lead and antimony, or the alkali metals or alkaline earth metals themselves, in particular sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, titanium tetrabutylate, titanium tetrapropylate, zirconium butylate, zirconium propylate, titanium tetraphenolate, sodium phenolate, germanium dioxide, antimony trioxide, dibutyl tin diacetate and dibutyl dimethoxy tin.

The quantities of catalyst are preferably from 0.001 to 1 mol %, in particular from 0.01 to 0.2 mol %, based on carboxylic acids or the derivatives thereof.

The reaction temperature of the preferred transesterification process may be from 150° to 350° C., the reaction being started at a low temperature which is increased as the reaction proceeds. As the rate of reaction slows down, a vacuum may be applied, in which case the pressure is preferably reduced from normal pressure to about 0.1 mbar.

In principle, a solid phase post-condensation may be carried out after the reaction, at a temperature of up to about 250° C., in which case the melt viscosities increase and the thermotropic polyester carbonates according to the present invention become insoluble in p-chlorophenol. However, this is not usually necessary.

It is occasionally desired to regulate the molecular weight, which may be achieved by the use of monofunctional compounds which terminate the polycondensation reactions.

Monofunctional compounds for this purpose include monofunctional carboxylic acids, preferably aromatic carboxylic acids, such as benzoic acid, chlorobenzoic acid, methylbenzoic acids, naphthalene carboxylic acids or diphenylcarboxylic acids, monofucntional aromatic hydroxy compounds, such as phenol, methylphenols, ethyl-phenols, p-nonylphenol, p-chlorophenol, 4-(1,1-dimethylpropyl)phenol, 4-(1,1,3,3-tetramethylbutyl)-phenol, dodecylphenols, dimethylphenol, hydroxynaphthalenes and monofunctional thiophenols, such as thiophenol and 4-methyl-thiophenol. 4-hydroxydiphenyl is preferably used.

Thus, the present invention also provides a process for the production of the new polyester carbonates by the esterification of:

(a) (optionally substituted) p-hydroxybenzoic acid; and, optionally,
(d) aromatic dicarboxylic acid, with
(c) diaryl carbonate, by the transesterification of the resulting aryl esters with
(b) diphenol, further diaryl carbonate (c) and, optionally, one or more chain-terminators nd by subsequent polycondensation at a temperature of from 150° to 350° C. in the presence of from 0.001 to 1 mol %, based on carboxylic acids or derivatives thereof, of a catalyst, optionally under reduced pressure.

The thermotropic polyester carbonates according to the present invention may advantageously be processed from the melt into injection mouldings, fibres and films as a result of the relatively low melt viscosity thereof, a molecule orientation being achieved due to shearing forces which arise, which orientation is greatly influenced by the intensity of the shearing forces. Moreover, the polyester carbonates exhibit a pronounced structural viscosity, i.e. the melt viscosity decreases considerably as the shearing forces increase.

Another essential feature of the aromatic thermotropic polyester carbonates according to the present invention is the high impact strength or notched impact strength.

Mouldings which have a high tensile strength, an extraordinary tenacity and a considerable dimensional stability may be produced from the present polyester carbonates. Since the polyester carbonates are extremely resistant to chemicals and since they are fireproof, they are preferably suitable for the production of: electrotechnical articles, for example insulators, printed circuits, plug contacts, staple parts, parts of chemico-technical apparatus, for example pipes, container linings, rotors, sliding bearings, seals, parts of aircraft interior fittings, and parts of medico-technical devices, for example constructional parts of air-conditioning plant and parts of valves.

The polyester carbonates according to the present invention are also suitable for the production of films and fibres on account of the particular properties thereof.

Thus, the present invention also provides the use of the new polyester carbonates for the production of mouldings, filaments, fibres and films.

EXAMPLES

The impact strength $a_n$ test and the notched impact strength $a_k$ test were carried out on standard small rods according to DIN 53 453 (ISO/R 179) at 23° C. in each case on 10 test bodies. The flexural strength was determined on standard small rods according to DIN 53 452 (ISO R 178). The bending E-modulus was determined according to DIN 53 457. The dimensional stability under heat was measured by determining the Vicat-B softening temperature according to DIN 53 460 (ISO 306). The flow behaviour in the melt was assessed by measuring the melt index (MFI) according to DIN 53 735 (ISO/R 1133). The nozzle had a length to thickness ratio (L:T) of 4:1, unless otherwise indicated.

EXAMPLE 1

173.8 g of p-hydroxybenzoic acid, 39.6 g of hydroquinone, 33.5 g of 4,4'-dihydroxy-diphenyl, 3.7 g of 4-hydroxy-diphenyl, 0.46 g of zinc(II)acetate and 404.6 g of diphenyl carbonate are heated to 250° C. in a reaction vessel equipped with a stirrer and a distillation bridge. Carbon dioxide began to evolve at an internal temperature of about 210° C. and the distillation of phenol started at a temperature of from 230° to 240° C.

After 1 hour, the distillation rate has slowed to such an extent that the temperature could be increased to 295° C. Once the distillation of phenol had substantially finished, a vacuum of $0.6 \times 10^{-3}$ bars was gradually applied over a period of 1 hour at 295° C. and the mixture was re-condensed over a period of 2 hours under this vacuum and at this temperature.

The resulting polyester carbonate exhibited a pronounced fibrous structure and was injection moulded at a mass temperature of 260° C. and at a moulding temperature of 70° C. The inherent viscosity $\eta_{inh}$ was 1.765.

EXAMPLE 2

150 g of p-hydroxybenzoic acid, 37.4 g of hydroquinone, 31.8 g of 4,4'-dihydroxy-diphenyl, 3.29 g of 4-hydroxy-diphenyl, 0.41 g of zinc(II)acetate and 359.5 g of diphenyl carbonate were heated to 250° C. in a reaction vessel as described in Example 1. After the reaction had continued for 1 hour, the temperature was increased to 295° C. As the distillation rate slowed down, a vacuum of $0.6 \times 10^{-3}$ bars was applied at this temperature over a period of 1 hour, and the mixture was re-condensed for 2 hours at this temperature and under this vacuum. The resulting product exhibited a pronounced fibrous structure and was injection moulded at a mass temperature of 260° C. and at a moulding temperature of 70° C. The inherent viscosity $\eta_{inh}$ was 1.885.

EXAMPLE 3

140.7 g of p-hydroxybenzoic acid, 39.6 g of hydroquinone, 22.3 g of 4,4'-dihydroxy-diphenyl, 0.38 g of zinc-(II)acetate and 337 g of diphenyl carbonate were heated to 250° C. as described in Example 1. After raising the temperature to 295° C. and as the distillation rate slowed, a vacuum of $0.8 \times 10^{-3}$ bars was gradually applied at this temperature over a period of 1 hour, and the mixture was re-condensed for 2 hours. The resulting product exhibited a pronounced fibrous structure and was injection moulded at a mass temperature of 260° C. and at a moulding temperature of 70° C. The inherent viscosity $\eta_{inh}$ was 1.880.

EXAMPLE 4

140.7 g of p-hydroxybenzoic acid, 46.2 g of hydroquinone, 11.1 g of 4,4'-dihydroxy-diphenyl, 0.37 g of zinc-(II)acetate and 337 g of diphenyl carbonate were heated to 250° C. as described in Example 1. After raising the temperature to 295° C. and as the distillation rate slowed, a vacuum of $1.2 \times 10^{-3}$ bars was gradually applied at this temperature over a period of 1 hour, and the mixture was re-condensed for 1 hour.

The resulting product also exhibited a pronounced fibrous structure and was injected moulded at a mass temperature of 260° C. and at a moulding temperature of 70° C. The inherent viscosity $\eta_{inh}$ was 2.228.

EXAMPLE 5

194 g of p-hydroxybenzoic acid, 48.6 g of hydroquinone, 40.7 g of 4,4'-dihydroxy-diphenyl, 17.1 g of terephthalic acid, 0.55 g of zinc(II)acetate and 487.6 diphenyl carbonate were heated to 250° C. as described in Example 1.

After raising the temperature to 295° C. and as the distillation rate slowed, a vacuum of $0.5 \times 10^{-3}$ bars was gradually applied at this temperature over a period of 1 hour and the mixture was re-condensed for 1 hour.

The resulting product also exhibited a pronounced fibrous structure and was injection moulded at a mass temperature of 285° C. and at a moulding temperature of 70° C. This polyester carbonate was insoluble in p-chlorophenol.

EXAMPLE 6

144.8 g of p-hydroxybenzoic acid, 24.75 g of hydroquinone, 41.85 g of 4,4'-dihydroxy-diphenyl, 0.38 g of zinc(II)acetate and 337.2 g of diphenyl carbonate were heated to 250° C. as described in Example 1.

After raising the temperature to 295° C. and as the distillation rate slowed, a vacuum of $1.06 \times 10^{-3}$ bars was gradually applied at this temperature over a period of 1 hour, and the mixture was re-condensed for 1 hour under this vacuum.

The resulting product exhibited a pronounced fibrous structure and was injection moulded at a mass temperature of 260° C. and at a moulding temperature of 70° C. The inherent viscosity $\eta_{inh}$ was 2.389.

The following Table provides a survey of the mechanical properties and melt viscosities of the polyester carbonates according to Examples 1 to 6.

TABLE

| Example | Impact strength [kJ/m$^2$] $a_n$ | Notched impact strength [kJ/m$^2$] $a_k$ | Flexural strength [MPa] | Bending E-Modulus [MPa] | Vicat-B-temperature [°C.] | Melt index [g/10 Min.] |
| --- | --- | --- | --- | --- | --- | --- |
| 1 | 53* | 30.5* | 94 | 4.120 | 116 | (280° C./2.16 kp) 93.6 |
| 2 | 77.2 | 36.7 | 90.8 | 4.084 | 111 | (280° C./2.16 kp) 48 (L/T = 10) |
| 3 | 91.6* | 59.3* | 95 | 3.950 | 117 | (280° C./2.16 kp) 22.3 |
| 4 | 79.9* | 53.5* | 100.2 | 4.247 | 121 | (280° C./2.16 kp) 133 |
| 5 | 61.3* | 41.8* | 98 | 5.880 | 143 | (300° C./21.6 kp) 22.4 |
| 6 | 45.2 | 42.4 | 77 | 3.054 | 116 | (280° C./1.2 kp) 9.5 |

* = broken

COMPARATIVE EXPERIMENT

The polyester carbonate obtained according to Example 1 of DE-PS No. 2,704,315 was tested for its melt flowability. In this test, a melt index value (280° C./21.6 kp) of 6.25 [g/10 min.] was determined.

This experiment clearly shows that this product has a substantially higher melt viscosity than the comparable product according to Example 6.

We claim:

1. Thermotropic, wholly-aromatic polyester carbonates having an inherent viscosity of at least 0.5 dl/g measured using a solution of 5 mg of polyester carbonate/ml of p-chlorophenol at 50° C., comprising:
   (a) p-hydroxybenzoic acid units or substituted p-hydroxybenzoic acid units substituted by at least one $C_1$–$C_4$ alkyl, $C_1$–$C_4$-alkoxy, $C_6$–$C_{10}$ aryl, $C_6$–$C_{10}$ alkaryl, or halogen;
   (b) diphenol units;
   (c) carbonic acid units; and,
   (d) aromatic dicarboxylic acid units; characterized in that some of the diphenol units (b) are present as 4,4'-dihydroxy-diphenyl units (e) and, apart from the end groups, the following applies to the molar ratios of (a) to (e):

$a+b=1$ $b=c+d$ $e/b=$ from 0.1 to 0.9; and $c/(c+d)=$ from 0.6 to 1;

$a=$ from 0.4 to 0.8;

$b-e=$ from 0.02 to 0.53;

$c=$ from 0.12 to 0.6;

$d=$ from 0 to 0.24; and $e=$ from 0.02 to 0.53.

2. Polyester carbonates according to claim 1, characterised in that they have an inherent viscosity of at least 0.1 dl/g.

3. Polyester carbonates according to claim 1, characterised in that the ratio e/b is from 0.11 to 0.7.

4. Polyester carbonates according to claim 1, characterised in that the ratio e/b is from 0.125 to 0.4.

5. A process for the production of the polyester carbonates according to claim 1 by the esterification of components (a), (c) and (d) followed by the transesterification of the resulting aryl esters with component (b), additional diaryl carbonate (c); and by subsequent polycondensation at a temperature of from 150° to 350° C. in the presence of from 0.001 to 1 mol %, based on carboxylic acids of a catalyst.

6. Polyester carbonate articles in the form of mouldings, filaments, fibers and films fabricated from polyester carbonates according to claim 1.

7. Polyester carbonates according to claim 1 wherein $a=$ from 0.6 to 0.75;

$b-e=$ from 0.06 to 0.36;

$c=$ from 0.175 to 0.4;

$d=$ from 0 to 0.12; and $e=$ from 0.275 to 0.28.

* * * * *